United States Patent
Nakamura et al.

(10) Patent No.: US 11,932,241 B2
(45) Date of Patent: Mar. 19, 2024

(54) DRIVING ASSIST SYSTEM

(71) Applicant: Toyota Jidosha Kabushiki Kaisha, Toyota (JP)

(72) Inventors: Satoshi Nakamura, Susono (JP); Kazuyuki Fujita, Gotemba (JP); Minami Sato, Ebina (JP); Takahisa Awata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 17/144,464

(22) Filed: Jan. 8, 2021

(65) Prior Publication Data
US 2021/0261119 A1      Aug. 26, 2021

(30) Foreign Application Priority Data

Feb. 21, 2020   (JP) .................... 2020-028591

(51) Int. Cl.
*B60W 30/09*   (2012.01)
*B60W 10/18*   (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0953; B60W 30/0956; B60W 2520/06; B60W 2554/4041; B60W 2710/207; B60W 2720/106; B60W 2720/10; B60W 2720/12; B60W 2720/24; B60W 2552/53; B60W 2554/4029;
(Continued)

(56) References Cited

U.S. PATENT DOCUMENTS

| 9,227,632 B1* | 1/2016 | Lee ................... B60W 30/0956 |
| 2016/0042237 A1* | 2/2016 | Shimizu ................. G08G 1/166 |
| | | 348/148 |

(Continued)

FOREIGN PATENT DOCUMENTS

| CN | 109249928 A | 1/2019 |
| JP | 2017182768 A | 10/2017 |

(Continued)

*Primary Examiner* — Rachid Bendidi
*Assistant Examiner* — Dana F Artimez
(74) *Attorney, Agent, or Firm* — Dinsmore & Shohl LLP

(57) ABSTRACT

A driving assist system executes driving assist control for avoiding a collision with a target ahead of a vehicle. The driving assist control operates when the target exists within an assist area. A crossing target is the target crossing a roadway area ahead of the vehicle from a first side toward a second side. The assist area for the crossing target is divided into a plurality of divided assist areas including a first assist area located on the first side as viewed from the vehicle and a second assist area located on the second side as viewed from the vehicle. When the crossing target exists in the second assist area, the driving assist system decreases a control strength of the driving assist control as compared with a case where the crossing target exists in the first assist area.

6 Claims, 17 Drawing Sheets

(51) Int. Cl.
*B60W 10/20* (2006.01)
*B60W 30/095* (2012.01)

(52) U.S. Cl.
CPC .... *B60W 30/0953* (2013.01); *B60W 30/0956* (2013.01); *B60W 2520/06* (2013.01)

(58) Field of Classification Search
CPC ..... B60W 2554/801; B60W 2554/802; B60W 2554/803; B60W 2554/804; B60W 2554/806; B60W 2554/40; B60W 2754/10; B60W 2754/20; B60W 2754/30; B60W 2754/40; B60W 2754/50; B60W 2754/70; B60T 2201/022; B60T 2201/024; B60T 7/22; B60Y 2300/0954; B60Y 2300/0952; G08G 1/16; G08G 5/04; G08G 3/02
See application file for complete search history.

(56) References Cited

U.S. PATENT DOCUMENTS

| | | | |
|---|---|---|---|
| 2017/0327110 A1 | 11/2017 | Inoue et al. | |
| 2018/0022328 A1* | 1/2018 | Tochigi | G06V 20/56 701/70 |
| 2018/0162387 A1* | 6/2018 | Sung | G08G 1/165 |
| 2019/0016316 A1* | 1/2019 | Sung | B60T 7/22 |
| 2020/0070819 A1* | 3/2020 | Tominaga | B60W 10/04 |
| 2020/0211394 A1* | 7/2020 | King | G06V 20/58 |
| 2021/0394752 A1* | 12/2021 | Satoh | B60W 30/09 |

FOREIGN PATENT DOCUMENTS

| | | |
|---|---|---|
| JP | 2017206040 A | 11/2017 |
| JP | 2018-012360 A | 1/2018 |

\* cited by examiner

DRIVING ASSIST SYSTEM

CROSS-REFERENCE TO RELATED APPLICATIONS

This application claims priority to Japanese Application No. 2020-028591 filed on Feb. 21, 2020, the entire contents of which are herein incorporated by reference.

BACKGROUND

Technical Field

The present disclosure relates to driving assist control that assists driving of a vehicle. In particular, the present disclosure relates to the driving assist control for avoiding a collision with a target ahead of the vehicle.

Background Art

Patent Literature 1 discloses a travel assist device that assists avoidance of collision between a vehicle and an object such as a pedestrian. The travel assist device determines whether an object detected based on a camera or a radar exists in a roadway area or a sidewalk area. The roadway area is set based on a detection position of a curb, a guardrail, or the like. When the object exists in the roadway area, an assist range is set to be larger than that when the object exists in the sidewalk area. When a future position of the object is included in the assist range, the travel assist device performs collision avoidance control in order to avoid a collision with the object.

LIST OF RELATED ART

Patent Literature 1: Japanese Laid-Open Patent Application Publication No. JP-2018-012360

SUMMARY

Driving assist control for avoiding a collision with a target ahead of a vehicle will be considered. In particular, the driving assist control with respect to a "crossing target" that crosses a roadway area ahead of the vehicle will be considered. A direction of movement of the crossing target at a first timing is a direction toward the vehicle, and a direction of movement of the crossing target at a second timing is a direction away from the vehicle. A possibility of collision with the crossing target at the second timing is significantly lower than that at the first timing. Since the possibility of collision is decreased, it is excessive to perform the driving assist control at the second timing with a same strength as in the case of the first timing.

An object of the present disclosure is to provide a technique capable of suppressing excessive driving assist control for avoiding a collision with a crossing target ahead of a vehicle.

An aspect of the present disclosure is directed to a driving assist system that assists driving of a vehicle. The driving assist system includes: a memory configured to store driving environment information indicating a driving environment for the vehicle; and a processor configured to execute driving assist control including at least one of deceleration control and steering control for avoiding a collision with a target ahead of the vehicle based on the driving environment information. The driving assist control operates when the target exists within an assist area and does not operate when the target exists outside the assist area. A roadway area in which the vehicle exists is an area between a first roadway boundary located on a first side as viewed from the vehicle and a second roadway boundary located on a second side opposite to the first side as viewed from the vehicle. A crossing target is the target that crosses the roadway area ahead of the vehicle from the first side toward the second side. The processor is further configured to divide the assist area for the crossing target into a plurality of divided assist areas. The plurality of divided assist areas include a first assist area located on the first side as viewed from the vehicle and a second assist area located on the second side as viewed from the vehicle. The processor is further configured to determine in which of the plurality of divided assist areas the crossing target exists, and to execute the driving assist control with a control strength according to a result of the determination. When the crossing target exists in the second assist area, the processor decreases the control strength of the driving assist control as compared with a case where the crossing target exists in the first assist area.

According the above aspect of the present disclosure, the assist area for the crossing target is divided into the plurality of divided assist areas. The plurality of divided assist areas include the first assist area located on the first side as viewed from the vehicle and the second assist area located on the second side as viewed from the vehicle. The driving assist system determines in which of the plurality of divided assist areas the crossing target exists, and executes the driving assist control with a control strength according to a result of the determination. In particular, the control strength when the crossing target exists in the second assist area is weaker than that when the crossing target exists in the first assist area. That is, the driving assist control with respect to the crossing target moving in a direction away from the vehicle becomes relatively weak. Therefore, excessive driving assist control with respect to the crossing target having a low possibility of collision is suppressed. Since the excessive driving assist control is suppressed, a sense of strangeness or a sense of annoyance felt by an occupant of the vehicle is reduced.

DETAILED DESCRIPTION

Embodiments of the present disclosure will be described with reference to the accompanying drawings.

1. Outline

Figure 1:
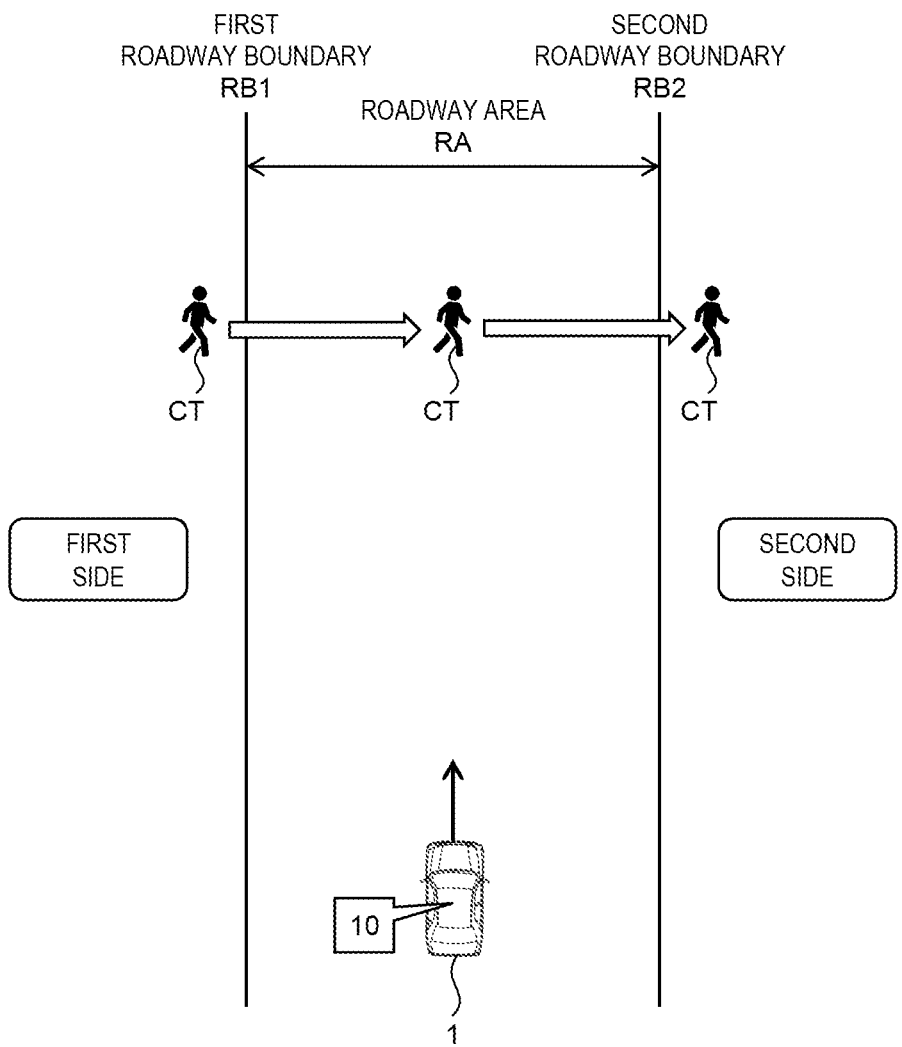
FIG. 1 is a conceptual diagram for explaining an outline of a driving assist system according to an embodiment of the present disclosure.

FIG. 1 is a conceptual diagram for explaining an outline of a driving assist system 10 according to the present embodiment. The driving assist system 10 performs "driving assist control" that assists driving of a vehicle 1. The driving assist control may be included in automated driving control for controlling automated driving of the vehicle 1. Typically, the driving assist system 10 is installed on the vehicle 1. Alternatively, at least a part of the driving assist system 10 may be disposed in an external device outside the vehicle 1 and remotely perform the driving assist control. That is, the driving assist system 10 may be distributed in the vehicle 1 and the external device.

In the present embodiment, the driving assist control for avoiding a collision with a target ahead of the vehicle 1 (i.e., collision avoidance control, risk avoidance control) will be considered. Examples of the target to be avoided include a pedestrian, a bicycle, a motorcycle, another vehicle (a preceding vehicle, a parked vehicle, and the like), an animal, a fallen object, and the like. The driving assist control for avoiding a collision with the target ahead of the vehicle 1 includes at least one of deceleration control and steering control. That is, the driving assist system 10 automatically performs at least one of the deceleration and the steering of the vehicle 1 in order to avoid a collision with the target ahead of the vehicle 1.

The target to be avoided typically exists in or near a roadway ahead of the vehicle 1. In the present embodiment, a target crossing a roadway ahead of the vehicle 1 is considered in particular. The target crossing the roadway ahead of the vehicle 1 is hereinafter referred to as a "crossing target CT". Examples of such the crossing target CT include a pedestrian, a bicycle, an animal, and the like.

In order to describe the crossing target CT in more detail, a roadway area RA will be first described. As shown in FIG. 1, the vehicle 1 exists in the roadway area RA. The roadway area RA is an area between a first roadway boundary RB1 and a second roadway boundary RB2. The first roadway boundary RB1 is one boundary of the roadway area RA, and is located on a first side (the left side in the example shown in FIG. 1) as viewed from the vehicle 1. The second roadway boundary RB2 is the other boundary of the roadway area RA, and is located on a second side (the right side in the example shown in FIG. 1) opposite to the first side as viewed from the vehicle 1. The roadway boundary is, for example, a lane edge line (i.e., an outermost lane marking). As another example, the roadway boundary may be a road end object such as a curb, a guardrail, a wall, and a median strip. A first direction toward the first side is a direction toward the first roadway boundary RB1, and a second direction toward the second side is a direction toward the second roadway boundary RB2.

The crossing target CT is a target that crosses the roadway area RA ahead of the vehicle 1 from the first side toward the second side. In other words, the crossing target CT is a target that crosses the roadway area RA ahead of the vehicle 1 in the second direction. More specifically, the crossing target CT enters the roadway area RA across the first roadway boundary RB1. Furthermore, the crossing target CT moves in the roadway area RA toward the second roadway boundary RB2. Then, the crossing target CT goes out of the roadway area RA across the second roadway boundary RB2.

Next, the driving assist control for avoiding a collision with the crossing target CT will be described with reference to FIGS. 2 and 3. To that end, an "assist area SA" will be first described.

The assist area SA is an area that is set ahead of the vehicle 1, and is used for determining whether or not to activate the driving assist control with respect to a target. More specifically, the driving assist control operates when the target exists within the assist area SA. On the other hand, the driving assist control does not operate when the target exists outside the assist area SA. That is, the driving assist system 10 executes the driving assist control so as to avoid a collision with the target that exists in the assist area SA. A longitudinal width of the assist area SA along a travel direction of the vehicle 1 is set to, for example, a distance corresponding to a predetermined time to collision (TTC). A lateral width of the assist area SA, in particular, a lateral width of the assist area SA with respect to the crossing target CT is as follows.

The assist area SA for the crossing target CT is an area between an assist start boundary SB1 and an assist end boundary SB2. The assist start boundary SB1 is a boundary on the first side of the assist area SA and is located on the first side as viewed from the vehicle 1. On the other hand, the assist end boundary SB2 is a boundary on the second side of the assist area SA and is located on the second side as viewed from the vehicle 1. In the example shown in FIG. 2, the assist start boundary SB1 is the first roadway boundary RB1, and the assist end boundary SB2 is the second roadway boundary RB2. That is, the lateral width of the assist area SA coincides with the lateral width of the roadway area RA. However, the positions of the assist start boundary SB1 and the assist end boundary SB2 are not limited to the example shown in FIG. 2. The assist area SA may be narrower than the roadway area RA or wider than the roadway area RA.

As described above, the crossing target CT crosses the roadway area RA ahead of the vehicle 1 from the first side toward the second side. When the crossing target CT enters the assist area SA across the assist start boundary SB1, the driving assist control with respect to the crossing target CT is started. After that, when the crossing target CT goes out of the assist area SA across the assist end boundary SB2, the driving assist control with respect to the crossing target CT is ended.

Figure 2:
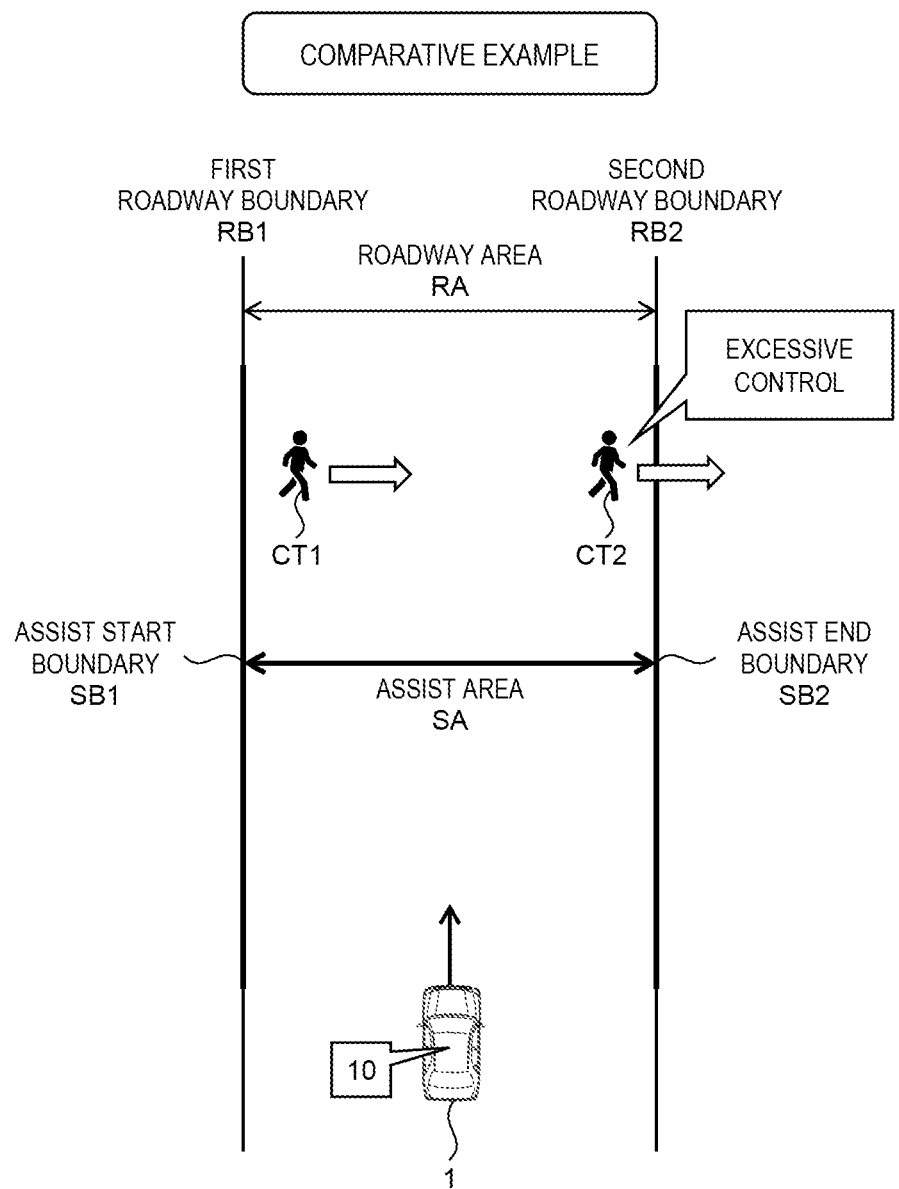
FIG. 2 is a conceptual diagram showing a comparative example.

FIG. 2 shows a comparative example. In the comparative example, the driving assist control is performed with a uniform control strength with respect to the crossing target CT existing in the assist area SA. For example, the deceleration control is performed with a same deceleration with respect to the crossing target CT existing in the assist area SA. However, in the case of this comparative example, the driving assist control with respect to the crossing target CT may be excessive. In order to explain this, the crossing target CT at two timings shown in FIG. 2 will be considered.

At a first timing, the crossing target CT is located in the assist area SA on the first side as viewed from the vehicle 1. At a second timing after the first timing, the crossing target CT is located in the assist area SA on the second side as viewed from the vehicle 1. For convenience sake, the crossing target CT at the first timing is referred to as a "first crossing target CT1", and the crossing target CT at the second timing is referred to as a "second crossing target CT2." A direction of movement of the first crossing target CT1 is a direction toward the vehicle 1. On the other hand, a direction of movement of the second crossing target CT2 is a direction away from the vehicle 1. Therefore, a possibility of collision with the second crossing target CT2 is significantly lower than a possibility of collision with the first crossing target CT1. It is not always necessary to perform the driving assist control with respect to the second crossing target CT2 in the same manner as the first crossing target CT1.

Since the possibility of collision is decreased, it is excessive to perform the driving assist control with a same strength as in the case of the first crossing target CT1. An occupant (typically, a driver) of the vehicle 1 feels a sense of strangeness or a sense of annoyance about such the excessive driving assist control. For example, when the deceleration control is performed with an excessive deceleration in order to avoid the second crossing target CT2 moving away from the vehicle 1, the occupant of the vehicle 1 feels a sense of strangeness or a sense of annoyance about the excessive deceleration control.

In view of the above, the present embodiment provides a technique capable of suppressing such the excessive driving assist control for avoiding a collision with the crossing target CT.

Figure 3:
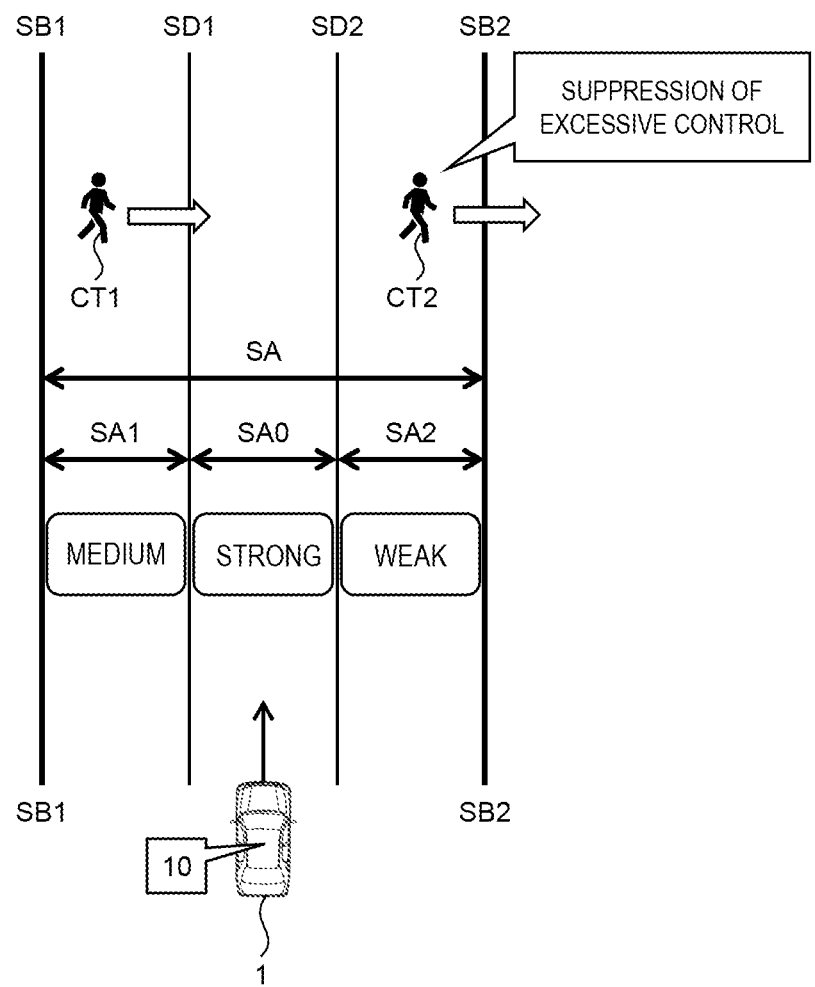
FIG. 3 is a conceptual diagram for explaining driving assist control and an assist area according to an embodiment of the present disclosure.

FIG. 3 is a conceptual diagram for explaining the assist area SA and the driving assist control with respect to the crossing target CT according to the present embodiment.

The driving assist system 10 divides the assist area SA for the crossing target CT into a plurality of divided assist areas SAi. The plurality of divided assist areas SAi (i=0 to 2) include a center assist area SA0, a first assist area SA1, and a second assist area SA2. The first assist area SA1 is located on the first side as viewed from the vehicle 1. The second assist area SA2 is located on the second side as viewed from the vehicle 1. The center assist area SA0 is sandwiched between the first assist area SA1 and the second assist area SA2. A first dividing boundary SD1 is a boundary between the center assist area SA0 and the first assist area SA1. A second dividing boundary SD2 is a boundary between the center assist area SA0 and the second assist area SA2.

Furthermore, the driving assist system 10 executes an "area determination process" that determines in which of the plurality of divided assist areas SAi the crossing target CT exists. Then, the driving assist system 10 executes the driving assist control with a "control strength" according to a result of the area determination process. More specifically, when the crossing target CT exists in the center assist area SA0, the control strength of the driving assist control is the strongest. The control strength of the driving assist control when the crossing target CT exists in the first assist area SA1 is weaker than that when the crossing target CT exists in the center assist area SA0. The control strength of the driving assist control when the crossing target CT exists in the second assist area SA2 is further weaker than that when the crossing target CT exists in the first assist area SA1.

The "control strength" of the driving assist control is represented by, for example, a magnitude of a control amount of the driving assist control. When the driving assist control includes the deceleration control, the control amount of the driving assist control includes a deceleration in the deceleration control. When the driving assist control includes the steering control, the control amount of the driving assist control includes a steering angle (a steering amount) in the steering control. Increasing the control strength of the driving assist control means increasing the control amount of the driving assist control. Conversely, decreasing the control strength of the driving assist control means reducing the control amount of the driving assist control.

For example, the driving assist system 10 performs the deceleration control with a deceleration according to a result of the area determination process. More specifically, the deceleration (absolute value) when the crossing target CT exists in the center assist area SA0 is set to be the highest. The deceleration when the crossing target CT exists in the first assist area SA1 is set to be lower than that when the crossing target CT exists in the center assist area SA0. The deceleration when the crossing target CT exists in the second assist area SA2 is set to be further lower than that when the crossing target CT exists in the first assist area SA1. Adjusting the deceleration in this manner makes it possible to adjust the control strength of the driving assist control.

As described above, according to the present embodiment, the driving assist system 10 executes the driving assist control with the control strength according to the result of the area determination process. In particular, the control strength when the crossing target CT exists in the second assist area SA2 is weaker than that when the crossing target CT exists in the first assist area SA1. That is, the driving assist control with respect to the second crossing target CT2 moving in the direction away from the vehicle 1 becomes relatively weak. Therefore, excessive driving assist control with respect to the second crossing target CT2 having a low possibility of collision is suppressed. Since the excessive driving assist control is suppressed, a sense of strangeness or a sense of annoyance felt by an occupant (typically, a driver) of the vehicle 1 is reduced. This contributes to increase in confidence in the driving assist system 10.

On the other hand, the control strength when the crossing target CT exists in the first assist area SA1 is stronger than that when the crossing target CT exists in the second assist area SA2. That is, the driving assist control with respect to the first crossing target CT1 moving in the direction toward the vehicle 1 becomes relatively strong. Therefore, a sense of uneasiness felt by the occupant (typically, the driver) of the vehicle 1 is reduced. This also contributes to increase in confidence in the driving assist system 10.

It can be said that the control strength of the driving assist control is set to be "asymmetric" between the first assist area SA1 and the second assist area SA2 according to the present embodiment. Such the asymmetric setting makes it possible to appropriately execute the driving assist control with respect to the crossing target CT.

Hereinafter, the driving assist system 10 according to the present embodiment will be described in more detail.

2. Driving Assist System 2-1. Configuration Example

Figure 4:
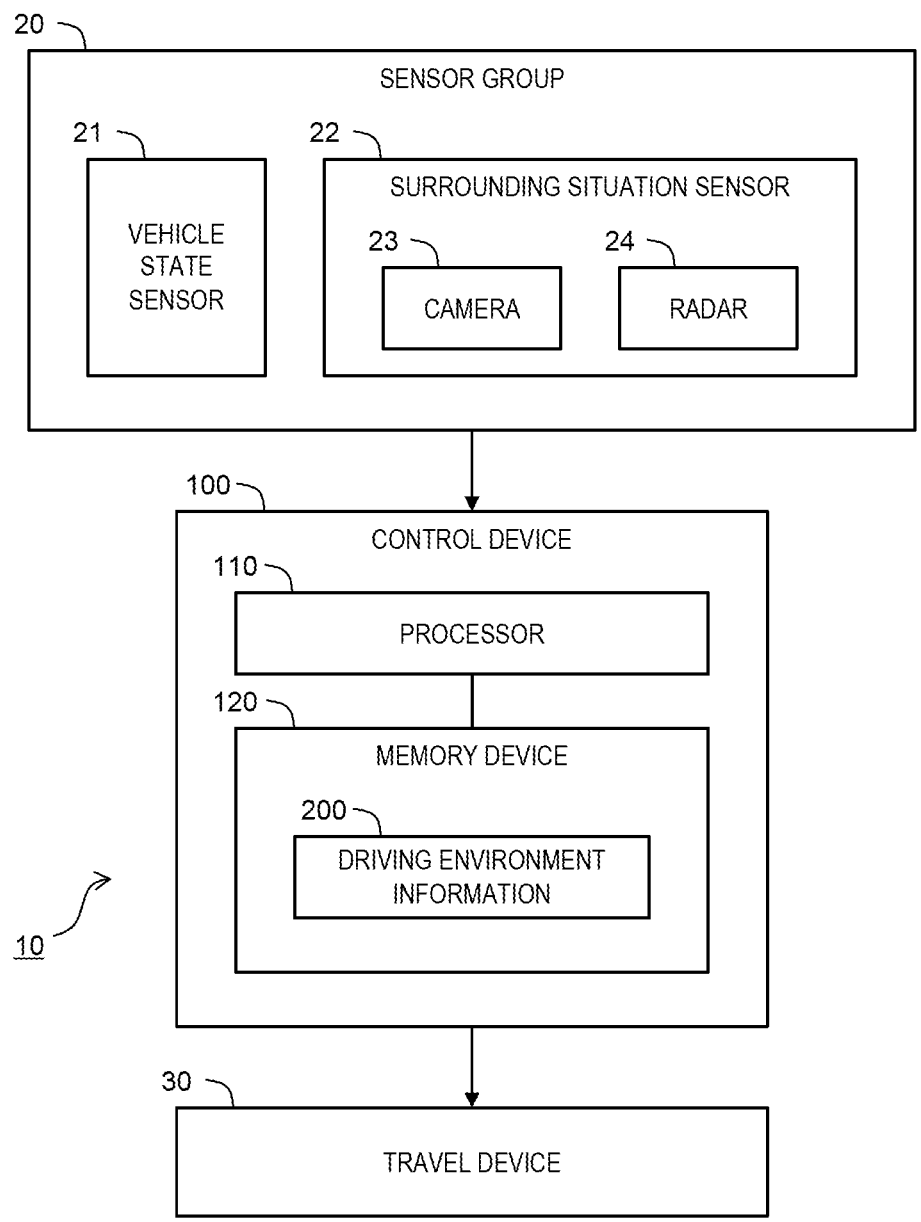
FIG. 4 is a block diagram schematically showing a configuration example of a vehicle and the driving assist system according to an embodiment of the present disclosure.

FIG. 4 is a block diagram schematically showing a configuration example of the vehicle 1 and the driving assist system 10 according to the present embodiment. In particular, FIG. 4 shows a configuration example related to the driving assist control. The vehicle 1 includes a sensor group 20 and a travel device 30.

The sensor group 20 includes a vehicle state sensor 21. The vehicle state sensor 21 detects a state of the vehicle 1. For example, the vehicle state sensor 21 includes a vehicle speed sensor, a yaw rate sensor, a lateral acceleration sensor, a steering angle sensor, and the like. The vehicle speed sensor detects a vehicle speed of the vehicle 1. The yaw rate sensor detects a yaw rate of the vehicle 1. The lateral acceleration sensor detects a lateral acceleration of the vehicle 1. The steering angle sensor detects a steering angle of a wheel of the vehicle 1.

The sensor group 20 further includes a surrounding situation sensor 22. The surrounding situation sensor 22 detects a situation around the vehicle 1. More specifically, the surrounding situation sensor 22 includes a camera 23 and a radar (millimeter wave radar) 24. The camera 23 is an imaging device that images a situation around the vehicle 1. The radar 24 is a ranging sensor that measures a situation around the vehicle 1. The surrounding situation sensor 22 may further include a LIDAR (Laser Imaging Detection and Ranging).

The travel device 30 includes a steering device, a driving device, and a braking device. The steering device turns (i.e., changes a direction of) the wheel of the vehicle 1. For example, the steering device includes an electric power steering (EPS) device. The driving device is a power source that generates a driving force. Examples of the driving device include an engine, an electric motor, an in-wheel motor, and the like. The braking device generates a braking force.

The driving assist system 10 includes at least a control device (controller) 100. The driving assist system 10 may include the sensor group 20. The driving assist system 10 may include the travel device 30.

The control device 100 controls the vehicle 1. Typically, the control device 100 is a microcomputer installed on the vehicle 1. The control device 100 is also called an electronic control unit (ECU). Alternatively, the control device 100 may be an information processing device outside the vehicle 1. In that case, the control device 100 communicates with the vehicle 1 and remotely controls the vehicle 1.

The control device 100 includes a processor 110 and a memory device 120. The processor 110 executes a variety of processing. The memory device 120 stores a variety of information. Examples of the memory device 120 include a volatile memory, a nonvolatile memory, and the like. The variety of processing by the processor 110 (the control device 100) is achieved by the processor 110 executing a control program being a computer program. The control program is stored in the memory device 120 or recorded in a computer-readable recording medium.

2-2. Information Acquisition Process

The processor 110 (the control device 100) executes an "information acquisition process" that acquires driving environment information 200 indicating a driving environment for the vehicle 1. The driving environment information 200 is acquired based on a result of detection by the sensor group 20 installed on the vehicle 1. The acquired driving environment information 200 is stored in the memory device 120.

Figure 5:
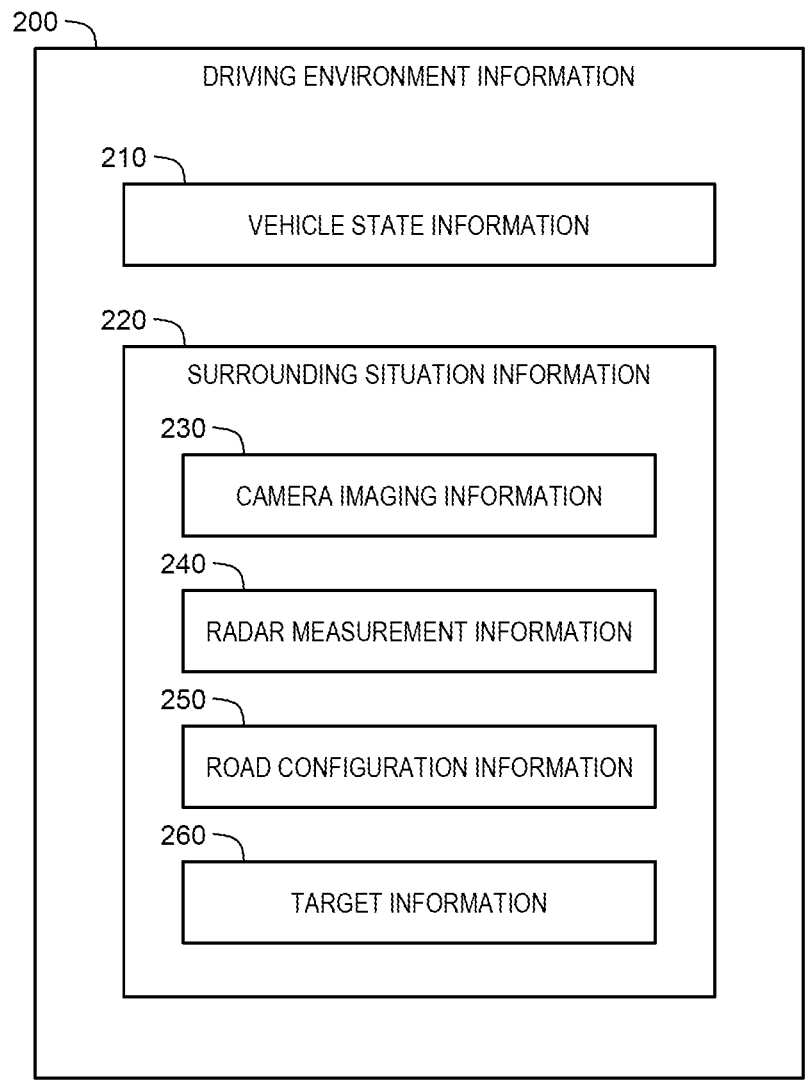
FIG. 5 is a block diagram showing an example of driving environment information in an embodiment of the present disclosure.

FIG. 5 is a block diagram showing an example of the driving environment information 200. The driving environment information 200 includes vehicle state information 210 and surrounding situation information 220.

The vehicle state information 210 is information indicating the state of the vehicle 1. Examples of the state of the vehicle 1 include the vehicle speed, the yaw rate, the lateral acceleration, the steering angle, and the like. The processor 110 acquires the vehicle state information 210 from a result of detection by the vehicle state sensor 21.

The surrounding situation information 220 is information indicating the situation around the vehicle 1. The processor 110 acquires the surrounding situation information 220 based on a result of detection by the surrounding situation sensor 22. For example, the surrounding situation information 220 includes camera imaging information 230, radar measurement information 240, road configuration information 250, and target information 260.

The camera imaging information 230 is information indicating a result of imaging by the camera 23. The camera imaging information 230 includes image information indicating the situation around the vehicle 1 imaged by the camera 23.

The radar measurement information 240 is information indicating a result of measurement by the radar 24. The radar measurement information 240 includes information (for example, a relative position and a relative speed) of an object around the vehicle 1.

The road configuration information 250 is information on a road configuration around the vehicle 1. The road configuration around the vehicle 1 includes lane markings (white lines) and road end objects. The road end object is a three dimensional obstacle representing an end of a road. Examples of the road end object include a curb, a guardrail, a wall, a median strip, planting, and the like. The road configuration information 250 indicates at least a position (a relative position with respect to the vehicle 1) of each of the lane marking and the road end object.

For example, analyzing the camera imaging information 230 (the image information) makes it possible to identify the lane marking and calculate the relative position of the lane marking. Examples of the image analysis method include semantic segmentation and edge detection. Similarly, analyzing the camera imaging information 230 (the image information) makes it possible to identify the road end object and calculate the relative position of the road end object. Alternatively, since a reflection intensity of the radar wave from the three dimensional road end object is high, the relative position of the road end object may be acquired from the radar measurement information 240.

The target information 260 is information on a target around the vehicle 1. Examples of the target include a pedestrian, a bicycle, a motorcycle, another vehicle (a preceding vehicle, a parked vehicles, and the like), an animal, a fallen object, and the like. The target information 260 indicates a relative position and a relative speed of the target with respect to the vehicle 1. For example, analyzing the camera imaging information 230 (the image information) makes it possible to identify the target and calculate the relative position of the target. It is also possible to identify the target and acquire the relative position and the relative speed of the target based on the radar measurement information 240. The target information 260 may include a direction of movement and a moving speed of the target. The direction of movement and the moving speed of the target can be calculated by tracking the position of the target.

2-3. Vehicle Travel Control

The processor 110 (the control device 100) executes "vehicle travel control" that controls travel of the vehicle 1. The vehicle travel control includes steering control that controls steering of the vehicle 1, acceleration control that controls acceleration of the vehicle 1, and deceleration control that controls deceleration of the vehicle 1. The processor 110 executes the vehicle travel control by controlling the travel device 30. More specifically, the processor 110 executes the steering control by controlling the steering device. The processor 110 executes the acceleration control by controlling the driving device. The control device 100 executes the deceleration control by controlling the braking device.

2-4. Outline of Driving Assist Control

The processor 110 (the control device 100) executes the "driving assist control" that assists driving of the vehicle 1. In particular, the processor 110 executes the driving assist control (collision avoidance control, risk avoidance control) for avoiding a collision with a target ahead of the vehicle 1. The driving assist control for avoiding a collision with a target ahead of the vehicle 1 includes at least one of the deceleration control and the steering control. The processor 110 executes the driving assist control based on the above-described driving environment information 200.

Figure 6:
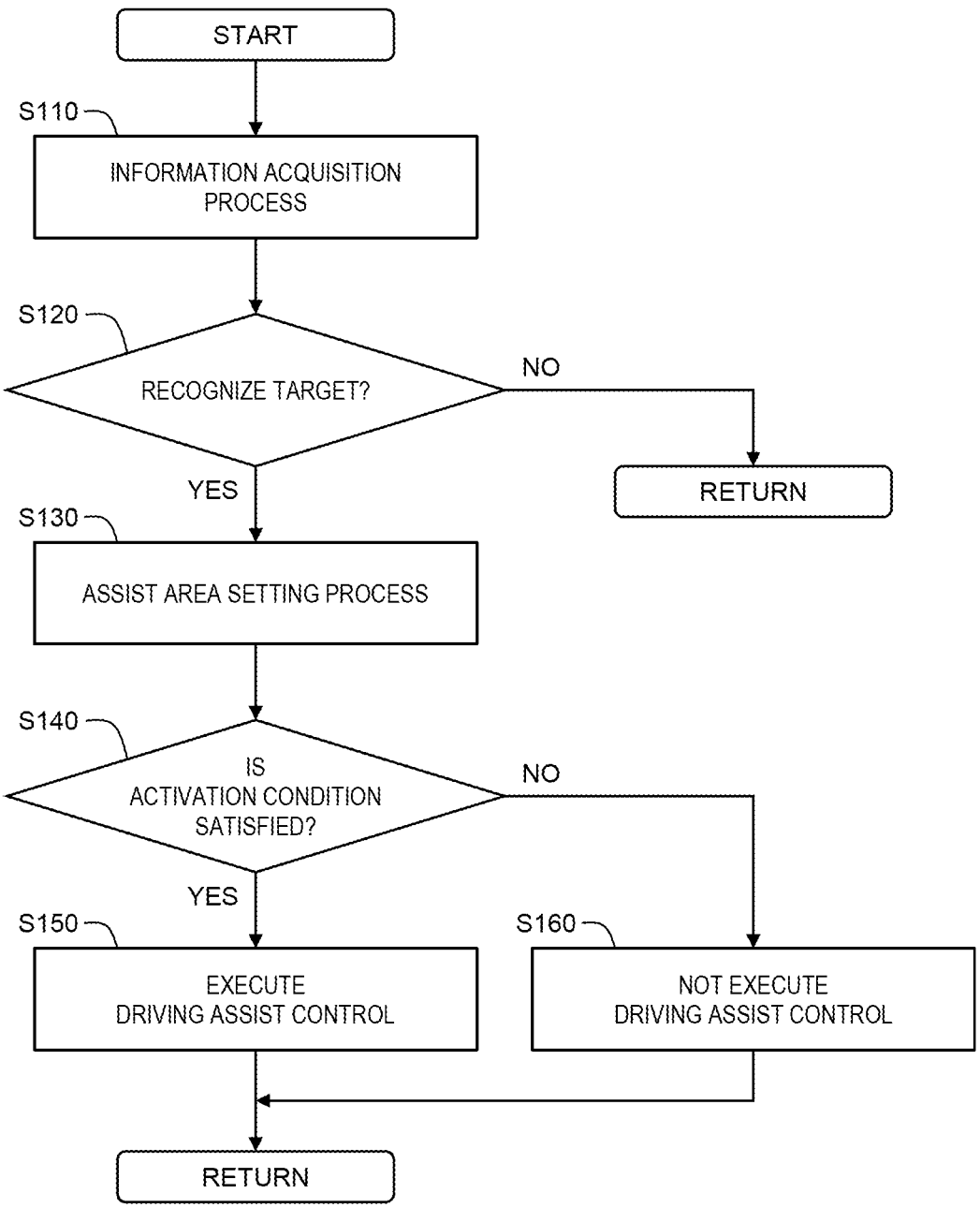
FIG. 6 is a flow chart showing processing related to the driving assist control by the driving assist system according to an embodiment of the present disclosure.

FIG. 6 is a flow chart showing processing related to the driving assist control according to the present embodiment. The process flow shown in FIG. 6 is repeatedly executed at a predetermined cycle.

In Step S110, the processor 110 executes the information acquisition process described above. That is, the processor 110 acquires the driving environment information 200 based on the result of detection by the sensor group 20. The driving environment information 200 is stored in the memory device 120.

In Step S120, the processor 110 determines whether or not a target exists ahead of the vehicle 1 based on the target information 260. In other words, the processor 110 determines whether or not a target is recognized in an area ahead of the vehicle 1.

In particular, the crossing target CT is a target that crosses the roadway area RA ahead of the vehicle 1 from the first side toward the second side. The processor 110 recognizes a target crossing the roadway area RA ahead of the vehicle 1 from the first side toward the second side, as the crossing target CT. The boundary (RB1, RB2) of the roadway area RA is a lane edge line or a road end object. The positions of the lane edge line and the road end object are obtained from the road configuration information 250. The position and the direction of movement of the target are obtained from the target information 260. Therefore, the processor 110 can recognize the crossing target CT based on the road configuration information 250 and the target information 260.

When a target exists ahead of the vehicle 1 (Step S120; Yes), the processing proceeds to Step S130. On the other hand, when no target exists ahead of the vehicle 1 (Step 120; No), the processing in the current cycle ends.

In Step S130, the processor 110 executes an "assist area setting process" that sets the assist area SA for the target. The assist area SA is an area that is set ahead of the vehicle 1, and is used for determining whether or not to activate the driving assist control with respect to the target. Details of the assist area setting process will be described later.

In subsequent Step S140, the processor 110 determines whether or not an activation condition of the driving assist control is satisfied. The activation condition of the driving assist control is that the target exists within the assist area SA. The position of the target is obtained from the target information 260. When the activation condition is satisfied (Step S140; Yes), the processing proceeds to Step S150. On the other hand, when the activation condition is not satisfied (Step S140; No), the processing proceeds to Step S160.

In Step S150, the processor 110 executes the driving assist control, that is, activates the driving assist control. More specifically, the processor 110 executes at least one of the deceleration control and the steering control based on the driving environment information 200 in order to avoid a collision between the vehicle 1 and the target. For example, the processor 110 calculates at least one of a target deceleration and a target steering angle necessary for avoiding a collision with the target, based on the vehicle state information 210 and the target information 260. The processor 110 controls the braking device in accordance with the target deceleration. The processor 110 controls the steering device in accordance with the target steering angle.

In Step S160, the processor 110 does not execute the driving assist control. That is, the processor 110 does not activate the driving assist control. When the driving assist control is already in execution, the processor 110 terminates the driving assist control.

3. Assist Area Setting Process (Step S130).

Hereinafter, the assist area setting process (Step S130) with respect to the crossing target CT will be described in detail. Various examples of the assist area setting process are conceivable.

3-1. First Example

Figure 7:
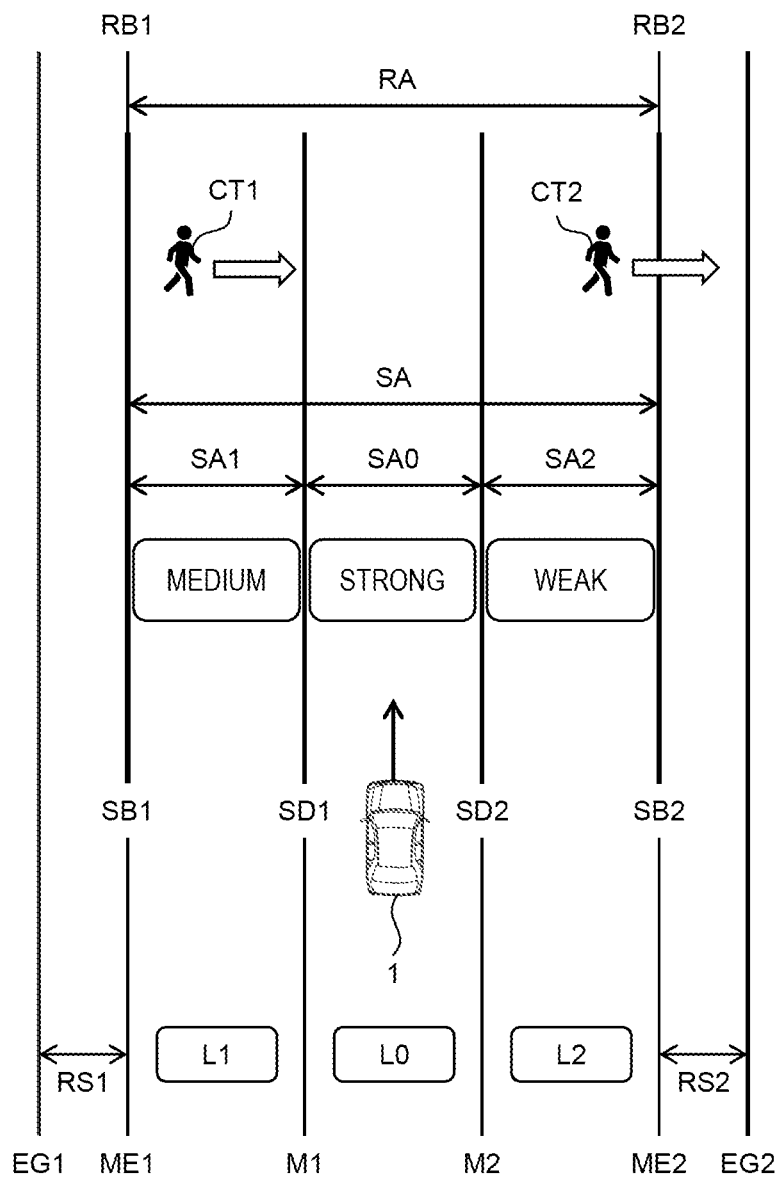
FIG. 7 is a conceptual diagram for explaining a first example of assist area setting process according to an embodiment of the present disclosure.

FIG. 7 is a conceptual diagram for explaining a first example of the assist area setting process with respect to the crossing target CT. In the first example, a case where lane markings exist on a road will be described.

A three-lane road is shown in FIG. 7. The vehicle 1 exist in a center lane L0. A first lane L1 exists on the first side of the lane L0. A second lane L2 exists on the second side of the lane L0.

A first nearby lane marking M1, a first lane edge line ME1, and a first road end object EG1 exist on the first side as viewed from the vehicle 1. The first nearby lane marking M1 is a lane marking on the first side of the lane L0 and represents a boundary between the lane L0 and the first lane L1. It can be said that the first nearby lane marking M1 is a lane marking closest to the vehicle 1 among the lane markings existing on the first side as viewed from the vehicle 1. The first lane edge line ME1 is a lane marking on the first side of the first lane L1 and represents a boundary between the first lane L1 and a first road shoulder RS1. The first road shoulder RS1 is an area between the first lane edge line ME1 and the first road end object EG1.

A second nearby lane marking M2, a second lane edge line ME2, and a second road end object EG2 exist on the second side as viewed from the vehicle 1. The second nearby lane marking M2 is a lane marking on the second side of the lane L0 and represents a boundary between the lane L0 and the second lane L2. It can be said that the second nearby lane marking M2 is a lane marking closest to the vehicle 1 among the lane markings existing on the second side as viewed from the vehicle 1. The second lane edge line ME2 is a lane marking on the second side of the second lane L2 and represents a boundary between the second lane L2 and a second road shoulder RS2. The second road shoulder RS2 is an area between the second lane edge line ME2 and the second road end object EG2.

The boundary (RB1, RB2) of the roadway area RA is the lane edge line or the road end object. For example, the roadway area RA is an area between the first lane edge line ME1 and the second lane edge line ME2. In this case, the first roadway boundary RB1 is the first lane edge line ME1, and the second roadway boundary RB2 is the second lane edge line ME2. As another example, the roadway area RA may be an area between the first road end object EG1 and the second road end object EG2. In this case, the first roadway boundary RB1 is the first road end object EG1, and the second roadway boundary RB2 is the second road end object EG2.

First, the processor 110 sets the assist start boundary SB1 and the assist end boundary SB2 of the assist area SA. For example, the processor 110 sets the assist start boundary SB1 at the position of the first roadway boundary RB1, and sets the assist end boundary SB2 at the position of the second roadway boundary RB2. However, the positions of the assist start boundary SB1 and the assist end boundary SB2 are not limited to that example. The assist area SA may be narrower than the roadway area RA or wider than the roadway area RA.

Further, the processor 110 divides the assist area SA into a plurality of divided assist areas SAi. The plurality of divided assist areas SAi include the center assist area SA0, the first assist area SA1, and the second assist area SA2. The processor 110 sets the center assist area SA0, the first assist area SA1, and the second assist area SA2 based on the first nearby lane marking M1 and the second nearby lane marking M2 of the lane L0.

In the example shown in FIG. 7, the processor 110 sets the first dividing boundary SD1 at the position of the first nearby lane marking M1. The processor 110 sets the second dividing boundary SD2 at the position of the second nearby lane marking M2. In this case, the center assist area SA0 is an area between the first nearby lane marking M1 and the second nearby lane marking M2. The first assist area SA1 is an area between the assist start boundary SB1 and the first nearby lane marking M1. The second assist area SA2 is an area between the assist end boundary SB2 and the second nearby lane marking M2.

The positions of the first roadway boundary RB1, the second roadway boundary RB2, the first nearby lane marking M1, and the second nearby lane marking M2 are obtained from the road configuration information 250. Therefore, the processor 110 is able to set the assist area SA, the center assist area SA0, the first assist area SA1, and the second assist area SA2 based on the road configuration information 250.

3-2. Second Example

Figure 8:
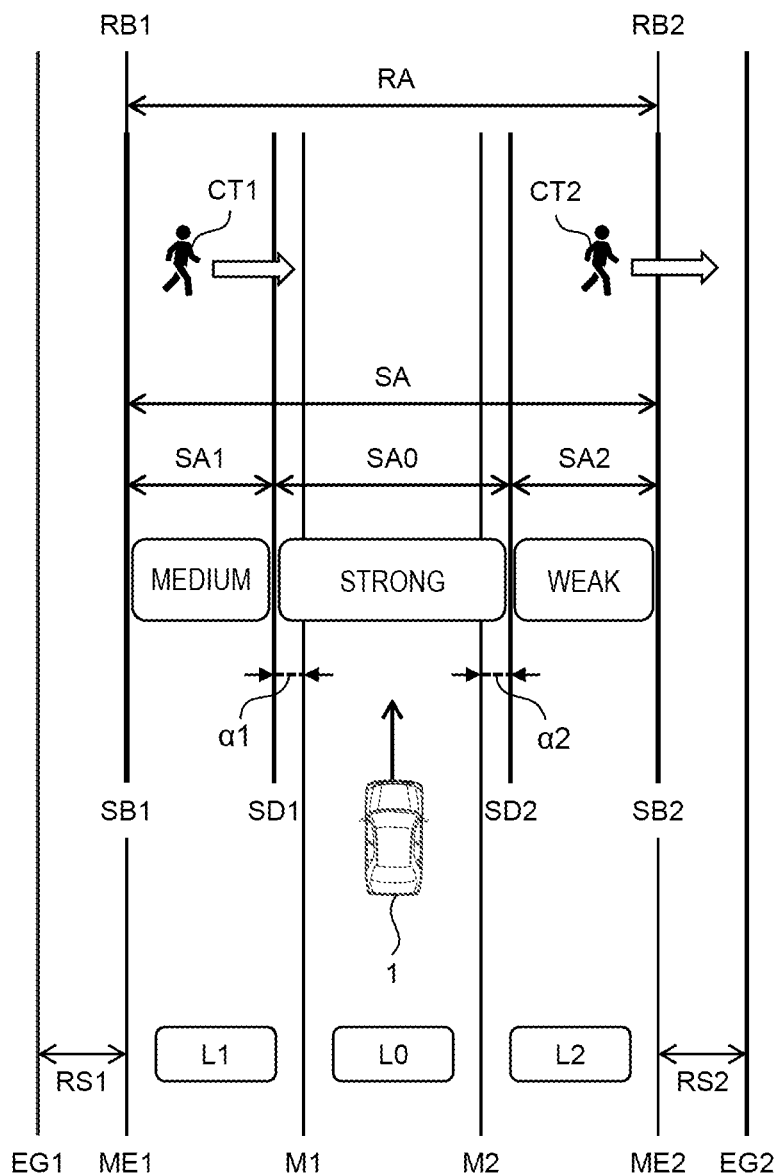
FIG. 8 is a conceptual diagram for explaining a second example of the assist area setting process according to an embodiment of the present disclosure.

FIG. 8 is a conceptual diagram for explaining a second example of the assist area setting process with respect to the crossing target CT. The description overlapping with the first example will be appropriately omitted.

In the second example also, the processor 110 sets the center assist area SA0, the first assist area SA1, and the second assist area SA2 on the basis of the first nearby lane marking M1 and the second nearby lane marking M2 of the lane L0. However, the center assist area SA0 is set to be wider than that in the first example. More specifically, the processor 110 sets the first dividing boundary SD1 at a position apart from the first nearby lane marking M1 toward the first side by a distance $\alpha1$. In addition, the processor 110 sets the second dividing boundary SD2 at a position apart from the second nearby lane marking M2 toward the second side by a distance $\alpha2$. The distances $\alpha1$ and $\alpha2$ may be the same or different. In either case, both the distances $\alpha1$ and $\alpha2$ are significantly smaller than a typical lane width.

3-3. Third Example

Figure 9:
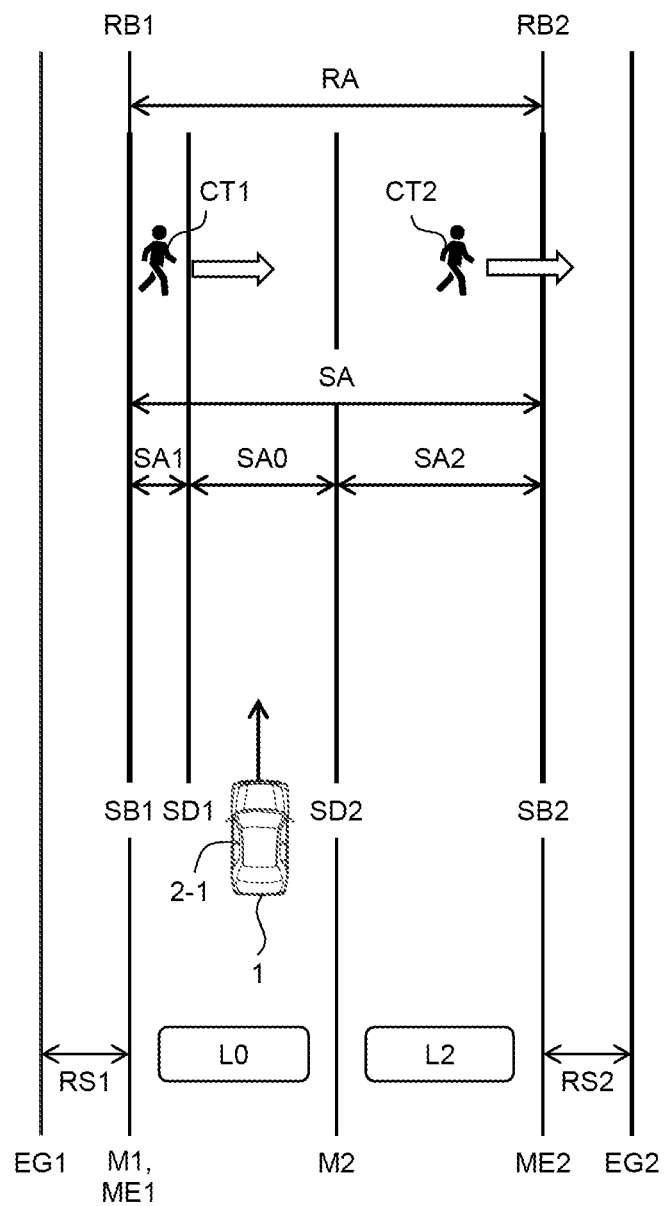
FIG. 9 is a conceptual diagram for explaining a third example of the assist area setting process according to an embodiment of the present disclosure.

FIG. 9 is a conceptual diagram for explaining a third example of the assist area setting process with respect to the crossing target CT. The description overlapping with the first example will be appropriately omitted.

In the third example, the first lane L1 does not exist on the first side of the lane L0, and the first nearby lane marking M1 is the first lane edge line ME1. In this case, the processor 110 sets the first dividing boundary SD1 at a position between the assist start boundary SB1 and a first vehicle end 2-1. The first vehicle end 2-1 is an end portion (side portion) of the vehicle 1 on the first side. For example, the processor 110 sets the first dividing boundary SD1 at a middle position between the assist start boundary SB1 and the first vehicle end 2-1.

The same applies to a case where the second lane L2 does not exist on the second side of the lane L0. The processor 110 sets the second dividing boundary SD2 at a position between the assist end boundary SB2 and a second vehicle end 2-2. The second vehicle end 2-2 is an end portion (side portion) of the vehicle 1 on the second side. For example, the processor 110 sets the second dividing boundary SD2 at a middle position between the assist end boundary SB2 and the second vehicle end 2-2.

3-4. Fourth Example

Figure 10:
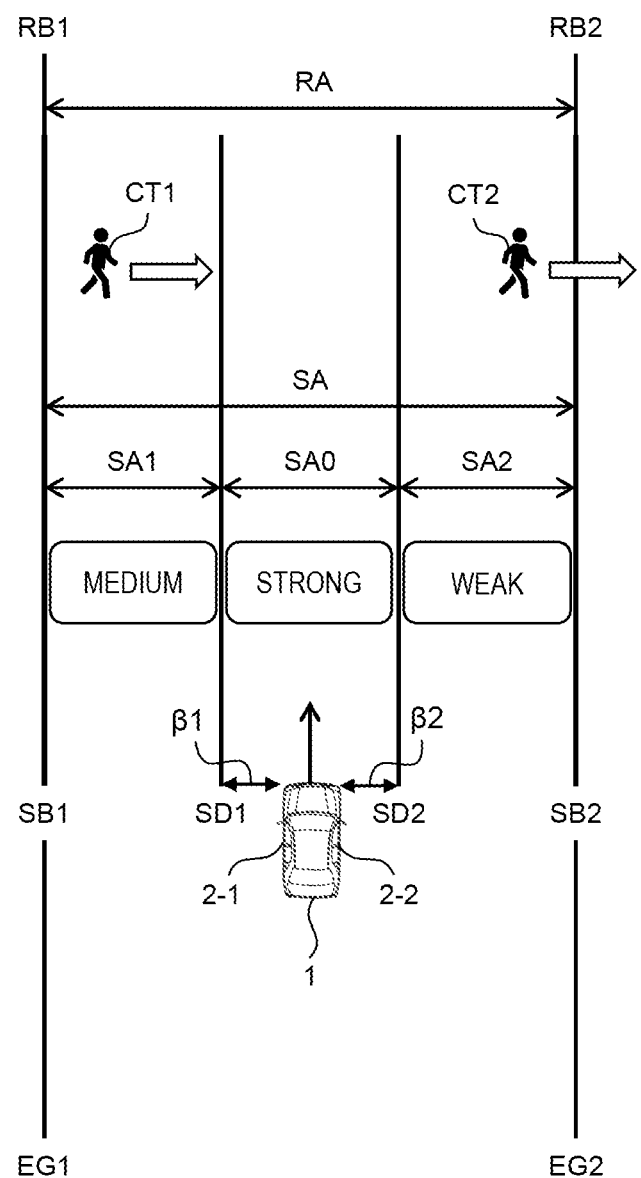
FIG. 10 is a conceptual diagram for explaining a fourth example of the assist area setting process according to an embodiment of the present disclosure.

FIG. 10 is a conceptual diagram for explaining a fourth example of the assist area setting process with respect to the crossing target CT. In the fourth example, a case where no lane marking exists on the road will be described. The description overlapping with the first example will be appropriately omitted.

In FIG. 10, the roadway area RA is an area between the first road end object EG1 and the second road end object EG2. That is, the first roadway boundary RB1 is the first road end object EG1, and the second roadway boundary RB2 is the second road end object EG2.

The processor 110 sets the center assist area SA0, the first assist area SA1, and the second assist area SA2 based on the vehicle end 2. The first vehicle end 2-1 is an end portion (side portion) of the vehicle 1 on the first side. The second vehicle end 2-2 is an end portion (side portion) of the vehicle 1 on the second side. The processor 110 sets the first dividing boundary SD1 at a position apart from the first vehicle end 2-1 toward the first side by a distance $\beta1$. Moreover, the processor 110 sets the second dividing boundary SD2 at a position apart from the second vehicle end 2-2 toward the second side by a distance β2. The distances β1 and β2 may be the same or different.

3-5. Assist Area Information

Figure 11:
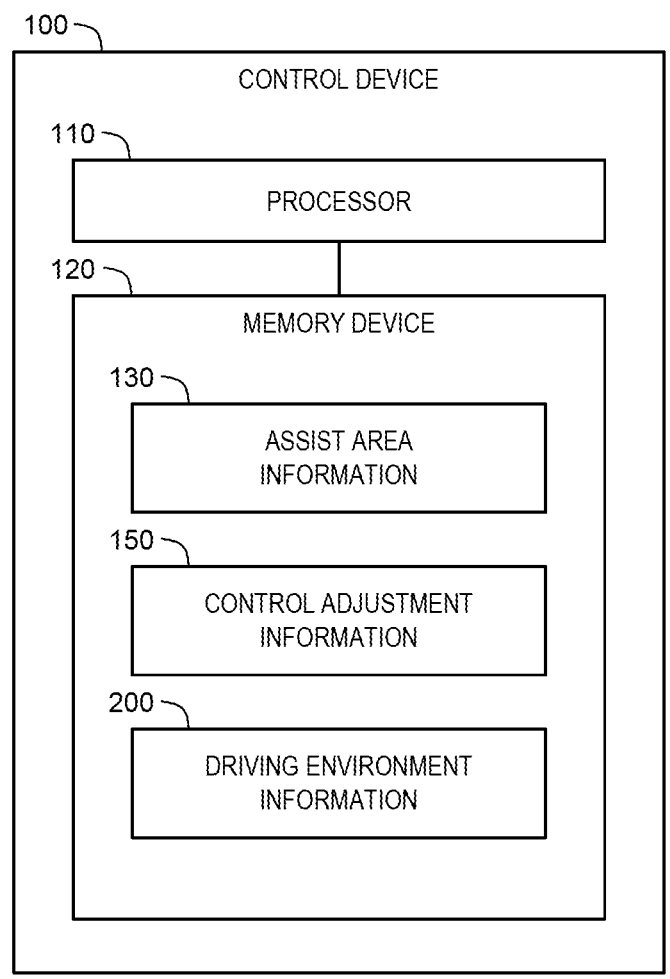
FIG. 11 is a block diagram showing information used in the driving assist system according to an embodiment of the present disclosure.

The processor 110 generates assist area information 130 by executing the assist area setting process. The assist area information 130 indicates the configuration of the assist area SA that is set by the assist area setting process. More specifically, the assist area information 130 indicates the positions of the assist area SA and the divided assist areas SAi (i.e., the center assist area SA0, the first assist area SA1, and the second assist area SA2). In other words, the assist area information 130 indicates the positions of the assist start boundary SB1, the assist end boundary SB2, the first dividing boundary SD1, and the second dividing boundary SD2. As shown in FIG. 11, the processor 110 stores the assist area information 130 in the memory device 120.

4. Area Determination Process (Step S140).

In Step S140, the processor 110 determines whether or not the activation condition of the driving assist control is satisfied. As described above, the activation condition of the driving assist control is that the target exists within the assist area SA.

In particular, in the case where the target is the crossing target CT, the processor 110 executes the "area determination process" that determines in which of the plurality of divided assist areas SAi the crossing target CT exists. The positions of the divided assist areas SAi are obtained from the assist area information 130. The position of the crossing target CT is obtained from the target information 260. Therefore, the processor 110 can execute the area determination process based on the assist area information 130 and the target information 260.

Figure 12:
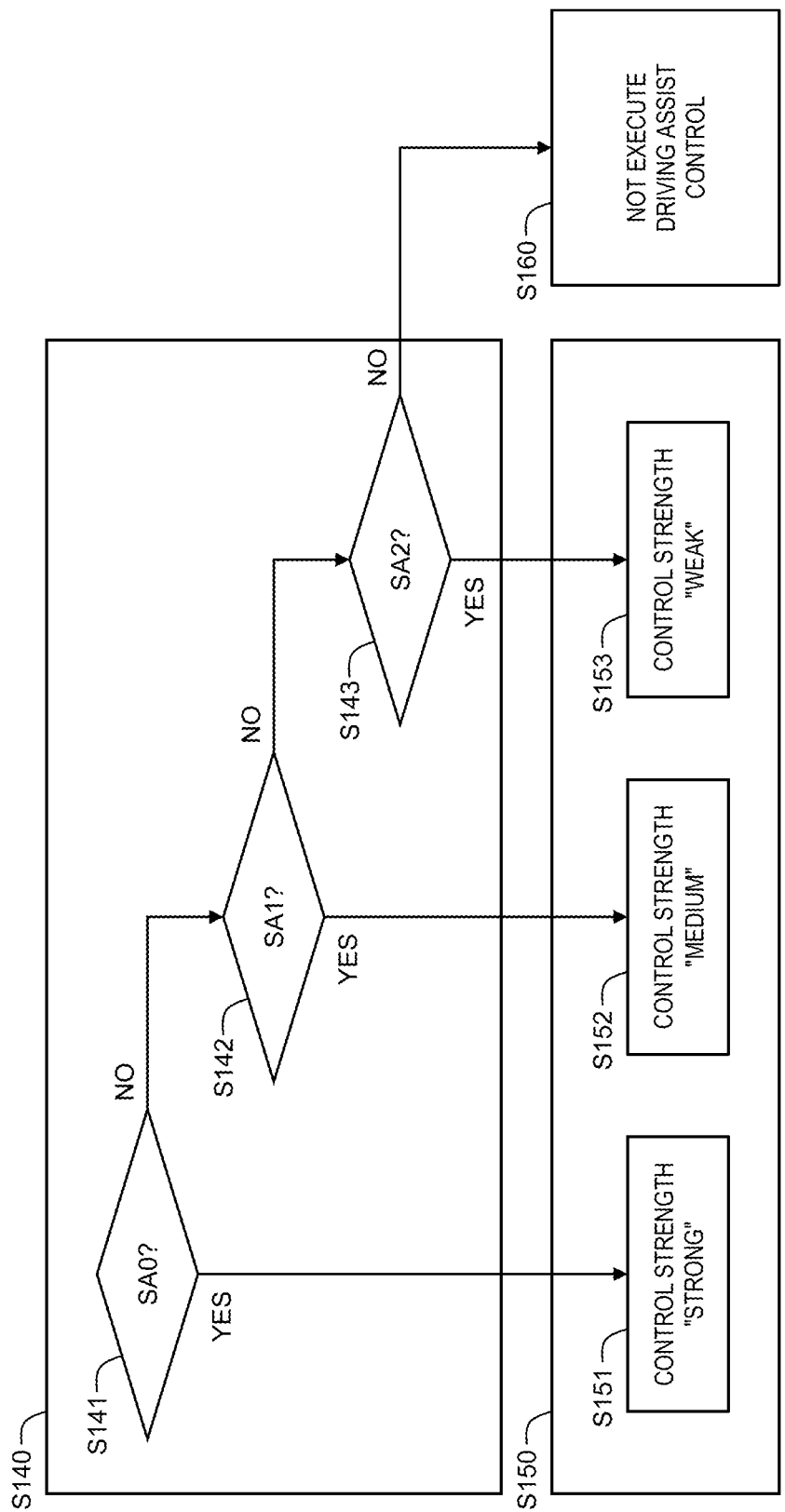
FIG. 12 is a flow chart showing an area determination process and the driving assist control according to an embodiment of the present disclosure.

FIG. 12 is a flow chart showing the area determination process and the driving assist control. When the crossing target CT exists in the center assist area SA0 (Step S141; Yes), the processing proceeds to Step S151. When the crossing target CT exists in the first assist area SA1 (Step S141; No, Step S142; Yes), the processing proceeds to Step S152. When the crossing target CT exists in the second assist area SA2 (Step S141; No, Step S142; No, and Step S143; No), the processing proceeds to Step S153. Otherwise (Step S140; No), the processing proceeds to Step S160.

5. Driving Assist Control According to Area Determination Result (Step S150).

Hereinafter, the driving assist control (Step S150) with respect to the crossing target CT will be described in detail. As shown in FIG. 12, the processor 110 executes the driving assist control with the control strength according to the result of the above-described area determination process (Step S140).

More specifically, in Step S151, the processor 110 sets the control strength of the driving assist control to be the highest. The crossing target CT exists in the center assist area SA0 closest to the vehicle 1. Strongly executing the driving assist control with respect to such the crossing target CT can reduce a sense of uneasiness felt by the occupant of the vehicle 1.

In Step S152, the processor 110 makes the control strength of the driving assist control weaker than that in the case of Step S151. The crossing target CT exists in the first assist area SA1 that is farther from the vehicle 1 than the center assist area SA0 is. Decreasing the control strength as compared with the case of Step S151 can reduce a sense of strangeness or a sense of annoyance felt by the occupant of the vehicle 1. Meanwhile, the direction of movement of the crossing target CT (i.e., the first crossing target CT1) existing in the first assist area SA1 is a direction toward the vehicle 1. Executing the driving assist control with respect to such the first crossing target CT1 with a certain degree of control strength can reduce a sense of uneasiness felt by the occupant of the vehicle 1.

In Step S153, the processor 110 further decreases the control strength of the driving assist control as compared with the case of Step S152. The direction of movement of the crossing target CT (i.e., the second crossing target CT2) is a direction away from the vehicle 1. The possibility of collision with the second crossing target CT2 is lower than that with the first crossing target CT1. Decreasing the control strength of the driving assist control can suppress excessive driving assist control with respect to the second crossing target CT2 having a low possibility of collision. Since the excessive driving assist control is suppressed, a sense of strangeness or a sense of annoyance felt by the occupant of the vehicle 1 is reduced.

As a method for adjusting the control strength of the driving assist control, various examples are conceivable. Hereinafter, various examples of the method of adjusting the control strength of the driving assist control will be described. It should be noted that "control adjustment information 150" shown in FIG. 11 is used for adjusting the control strength of the driving assist control. The control adjustment information 150 is created in advance and stored in the memory device 120.

5-1. First Example

Figure 13:
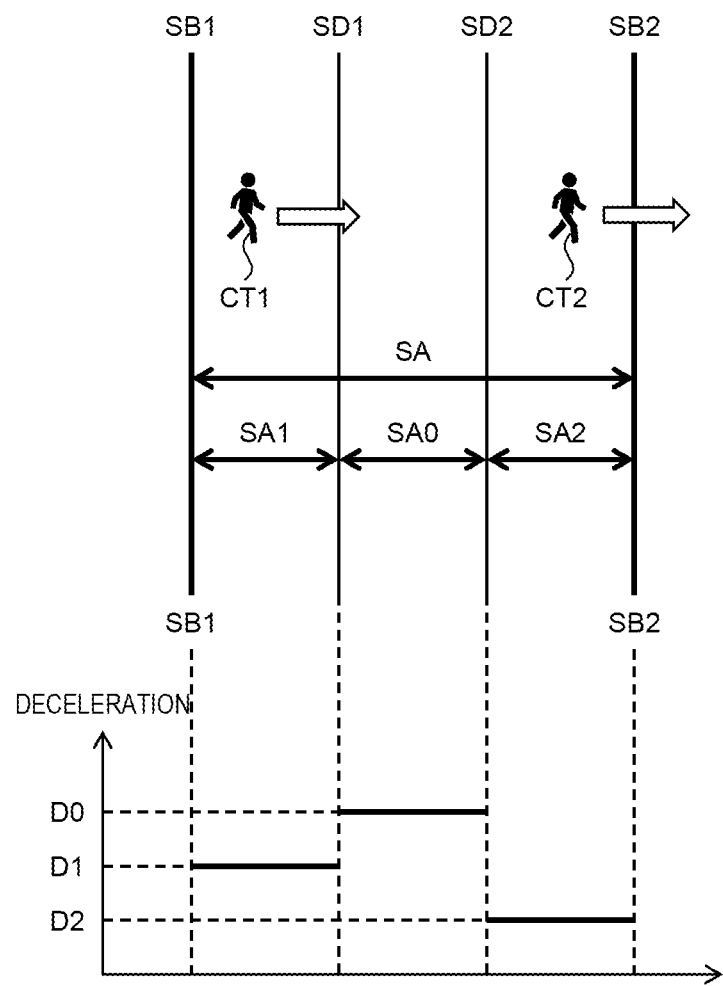
FIG. 13 is a conceptual diagram for explaining a first example of the driving assist control according to an embodiment of the present disclosure.

FIG. 13 is a conceptual diagram for explaining a first example of the driving assist control according to the present embodiment. The driving assist control for avoiding a collision with the crossing target CT typically includes the deceleration control. In this case, the control strength of the driving assist control is a deceleration in the deceleration control. Increasing the control strength of the driving assist control means increasing the deceleration (absolute value) in the deceleration control. Conversely, decreasing the control strength of the driving assist control means reducing the deceleration (absolute value) in the deceleration control.

As shown in FIG. 13, a different deceleration is set in advance for each of the plurality of divided assist areas SAi (SA0, SA1, SA2). The processor 110 executes the deceleration control at a deceleration according to the result of the area determination process. More specifically, when the crossing target CT exists in the center assist area SA0, the processor 110 executes the deceleration control at a default deceleration D0. When the crossing target CT exists in the first assist area SA1, the processor 110 executes the deceleration control at a first deceleration D1 lower than the default deceleration D0. When the crossing target CT exists in the second assist area SA2, the processor 110 executes the deceleration control at a second deceleration D2 that is further lower than the first deceleration D1.

The default deceleration D0, the first deceleration D1, and the second deceleration D2 are set in advance so as to satisfy a relationship of "D0>D1>D2." The control adjustment information 150 indicates respective setting values of the default deceleration D0, the first deceleration D1, and the second deceleration D2. Alternatively, the control adjustment information 150 may indicate the default deceleration D0, a ratio between the default deceleration D0 and the first deceleration D1, and a ratio between the default deceleration D0 and the second deceleration D2. In either case, the processor 110 is able to adjust the deceleration in the deceleration control, that is, the control strength of the driving assist control, based on the result of the area determination process and the control adjustment information 150.

Figure 14:
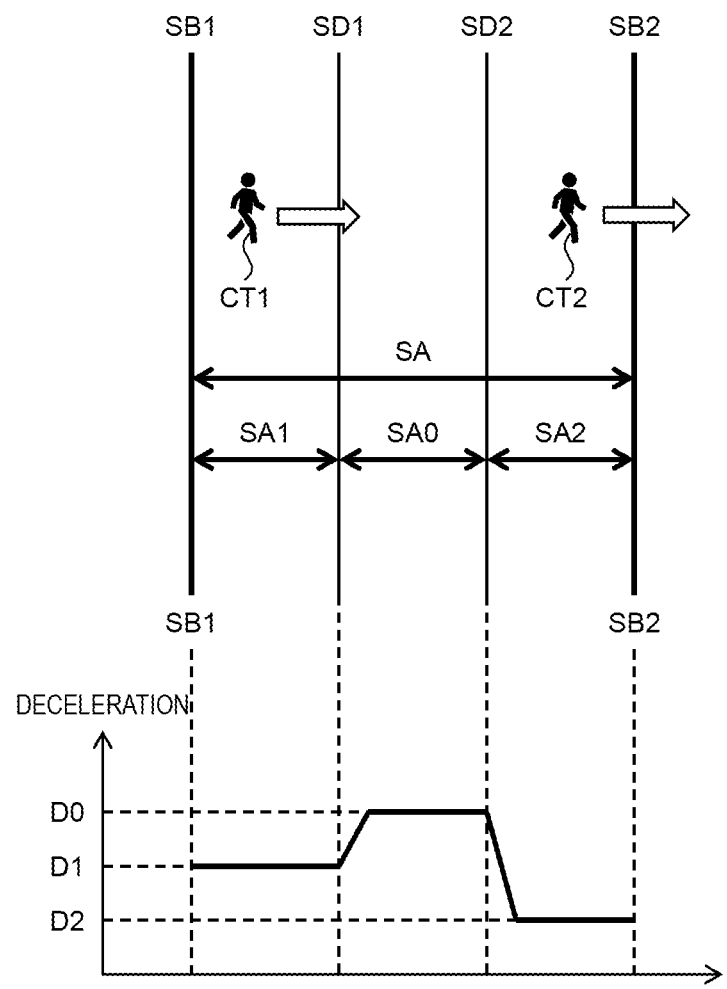
FIG. 14 is a conceptual diagram for explaining a modification example of the first example of the driving assist control according to an embodiment of the present disclosure.

FIG. 14 shows a modification example of the first example. When the crossing target CT moves from the first assist area SA1 into the center assist area SA0 across the first dividing boundary SD1, the processor 110 may gradually change the deceleration from the first deceleration D1 to the default deceleration D0. Similarly, when the crossing target CT moves from the center assist area SA0 to the second assist area SA2 across the second dividing boundary SD2, the processor 110 may gradually change the deceleration from the default deceleration to the second deceleration D2. As a result, a discontinuity of the deceleration is suppressed, and thus a sudden change in a behavior of the vehicle 1 is suppressed.

5-2. Second Example

Figure 15:
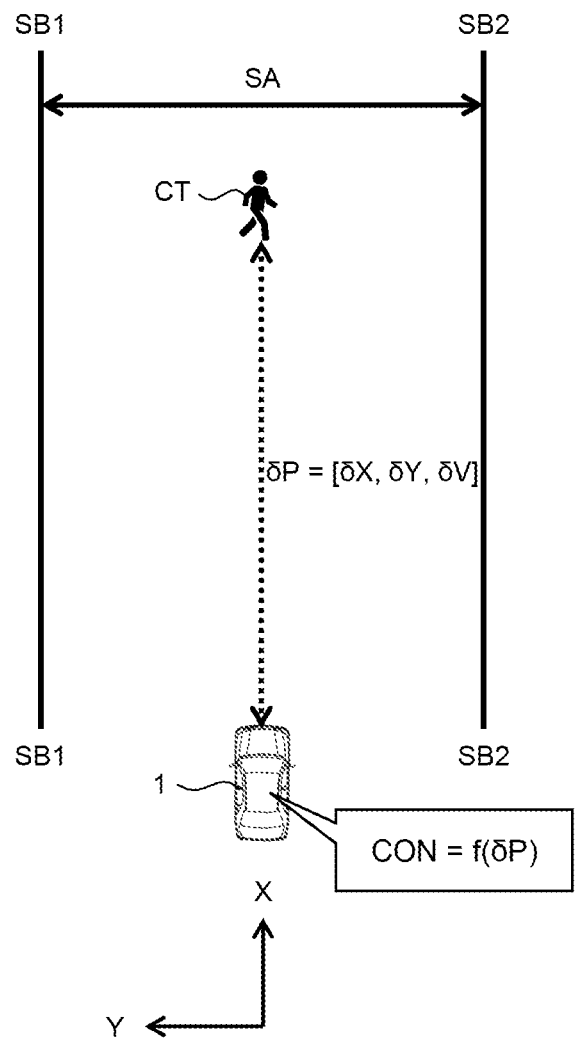
FIG. 15 is a conceptual diagram for explaining a second example of the driving assist control according to an embodiment of the present disclosure.

FIG. 15 is a conceptual diagram for explaining a second example of the driving assist control according to the present embodiment. A control amount in the driving assist control is hereinafter referred to as an "assist control amount CON". When the driving assist control includes the deceleration control, the assist control amount CON includes a deceleration (a target deceleration) in the deceleration control. When the driving assist control includes the steering control, the assist control amount CON includes a steering angle (a target steering angle) in the steering control.

In the second example, a case where the assist control amount CON dynamically changes depending on a relative relationship between the vehicle 1 and the crossing target CT is considered. A relative relationship parameter $\delta P$ representing the relative relationship between the vehicle 1 and the crossing target CT includes at least a relative position and a relative speed $\delta V$ between the vehicle 1 and the crossing target CT. The relative position between the vehicle 1 and the crossing target CT includes at least one of a longitudinal distance $\delta X$ between the vehicle 1 and the crossing target CT in an X-direction (i.e., a forward direction) and a lateral distance $\delta Y$ between the vehicle 1 and the crossing target CT in a Y-direction (i.e., a lateral direction). As expressed by the following equation (1), the assist control amount CON is expressed by a function of the relative relationship parameter $\delta P$.

$$CON=f(\delta P) \quad \text{Equation (1):}$$

The function f may be a mathematical expression or may be a map generated in advance. Information on the function f is included in the control adjustment information 150. The relative relationship parameter $\delta P$ is obtained from the target information 260. The processor 110 calculates (determines) the assist control amount CON corresponding to the relative relationship parameter $\delta P$ based on the control adjustment information 150 and the target information 260. Then, the processor 110 executes the driving assist control in accordance with the assist control amount CON.

As described above, according to the present embodiment, the processor 110 executes the driving assist control with the control strength according to the result of the area determination process. In the second example, the control strength of the driving assist control is a magnitude of the assist control amount CON. Increasing the control strength of the driving assist control means increasing the assist control amount CON corresponding to a same relative relationship parameter $\delta P$. Conversely, decreasing the control strength of the driving assist control means reducing the assist control amount CON corresponding to a same relative relationship parameter $\delta P$.

For example, a different function f is used for each of the plurality of divided assist areas SAi (SA0, SA1, SA2). The processor 110 calculates the assist control amount CON by using a function f according to the result of the area determination process. More specifically, when the crossing target CT exists in the center assist area SA0, the processor 110 calculates a default assist control amount CON0 by using a default function f0 (see Equation (2) below). When the crossing target CT exists in the first assist area SA1, the processor 110 calculates a first assist control amount CON1 by using a first function f1. When the crossing target CT exists in the second assist area SA2, the processor 110 calculates a second assist control amount CON2 by using a second function f2.

$$CON0=f0(\delta P)$$

$$CON1=f1(\delta P)<CON0=f0(\delta P)$$

$$CON2=f2(\delta P)<CON1=f1(\delta P) \quad \text{Equation (2):}$$

The default function f0 and the first function f1 are set such that the first assist control amount CON1 is smaller than the default assist control amount CON0 when compared under a condition that the relative relationship parameter $\delta P$ is the same. Similarly, the first function f1 and the second function f2 are set such that the second assist control amount CON2 is smaller than the first assist control amount CON1 when compared under a condition that the relative relationship parameter $\delta P$ is the same.

Information on the default function f0, the first function f1, and the second function f2 is included in the control adjustment information 150. The processor 110 refers to the control adjustment information 150, selects a function f according to the result of the area determination process, and calculates the assist control amount CON by using the selected function f. As a result, it is possible to execute the driving assist control with the assist control amount CON (i.e., the control strength) according to the result of the area determination process.

As another example, the first assist control amount CON1 may be expressed by a product of the default assist control amount CON0 and a first correction coefficient $\gamma 1$ (see Equation (3) below). Similarly, the second assist control amount CON2 may be expressed by a product of the default assist control amount CON0 and a second correction coefficient $\gamma 2$.

$$CON0=f0(\delta P)$$

$$CON1=\gamma 1 \times f0(\delta P)<CON0=f0(\delta P)$$

$$CON2=\gamma 2 \times f0(\delta P)<CON1=\gamma 1 \times f0(\delta P) \quad \text{Equation (3):}$$

The first correction coefficient $\gamma 1$ is set such that the first assist control amount CON1 is smaller than the default assist control amount CON0 when compared under a condition that the relative relationship parameter $\delta P$ is the same. Similarly, the first correction coefficient $\gamma 1$ and the second correction coefficient $\gamma 2$ are set such that the second assist control amount CON2 is smaller than the first assist control amount CON1 when compared under a condition that the relative relationship parameter $\delta P$ is the same.

Information on the default function f0, the first correction coefficient $\gamma 1$, and the second correction coefficient $\gamma 2$ is included in the control adjustment information 150. The processor 110 refers to the control adjustment information 150 to calculate the assist control amount CON by using a correction coefficient according to the result of the area determination process. As a result, it is possible to execute the driving assist control with the assist control amount CON (i.e., the control strength) according to the result of the area determination process.

5-3. Third Example

Figure 16:
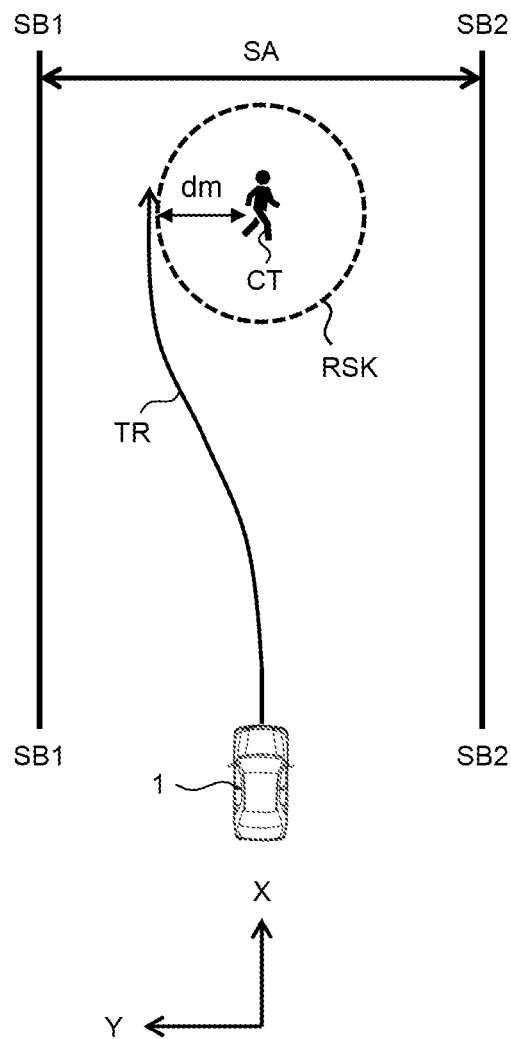
FIG. 16 is a conceptual diagram for explaining a third example of the driving assist control according to an embodiment of the present disclosure.

FIG. 16 is a conceptual diagram for explaining a third example of the driving assist control according to the present embodiment. In the third example, the processor 110 sets a risk area RSK around the crossing target CT. The risk area RSK is an area through which the vehicle 1 is desired not to pass. A margin distance dm is a parameter representing a size of the risk area RSK. For example, the margin distance dm is variably set according to the vehicle speed of the vehicle 1. In this case, the margin distance dm increases as the vehicle speed becomes higher. The position of the crossing target CT is obtained from the target information 260. The vehicle speed is obtained from the vehicle state information 210. Therefore, the processor 110 is able to set the risk area RSK based on the target information 260 and the vehicle state information 210.

Further, the processor 110 generates a target trajectory TR such that the vehicle 1 avoids the risk area RSK. The target trajectory TR includes a target position and a target speed of vehicle 1 in the roadway area RA. The roadway area RA is obtained from the road configuration information 250. The vehicle speed is obtained from the vehicle state information 210. Therefore, the processor 110 is able to generate the target trajectory TR based on the risk area RSK and the driving environment information 200. Then, the processor 110 executes at least one of the steering control and the deceleration control so that the vehicle 1 follows the target trajectory TR.

As described above, according to the present embodiment, the processor 110 executes the driving assist control with the control strength according to the result of the area determination process. In the third example, the control strength of the driving assist control is the size of the risk area RSK, that is, the margin distance dm. As the margin distance dm becomes larger, the steering angle or the deceleration required to avoid the risk area RSK increases, that is, the control strength of the driving assist control increases. Conversely, as the margin distance dm becomes smaller, the steering angle or the deceleration required to avoid the risk area RSK decreases, that is, the control strength of the driving assist control decreases.

For example, a different margin distance dm is used for each of the plurality of divided assist areas SAi (SA0, SA1, SA2). The processor 110 executes the driving assist control by using a margin distance dm according to the result of the area determination process. More specifically, when the crossing target CT exists in the center assist area SA0, the processor 110 executes the driving assist control by using a default margin distance dm0. When the crossing target CT exists in the first assist area SA1, the processor 110 executes the driving assist control by using a first margin distance dm1. When the crossing target CT exists in the second assist area SA2, the processor 110 executes the driving assist control by using a second margin distance dm2.

The default margin distance dm0, the first margin distance dm1, and the second margin distance dm2 are set so as to satisfy a relationship of "dm0>dm1>dm2." The control adjustment information 150 indicates the default margin distance dm0, the first margin distance dm1, and the second margin distance dm2. Alternatively, the control adjustment information 150 may indicate the default margin distance dm0, a ratio between the default margin distance dm0 and the first margin distance dm1, and a ratio between the default margin distance dm0 and the second margin distance dm2. In either case, the processor 110 is able to adjust the size of the risk area RSK, that is, the control strength of the driving assist control, based on the result of the area determination process and the control adjustment information 150.

6. Other Examples of Assist Area Setting Process

Figure 17:
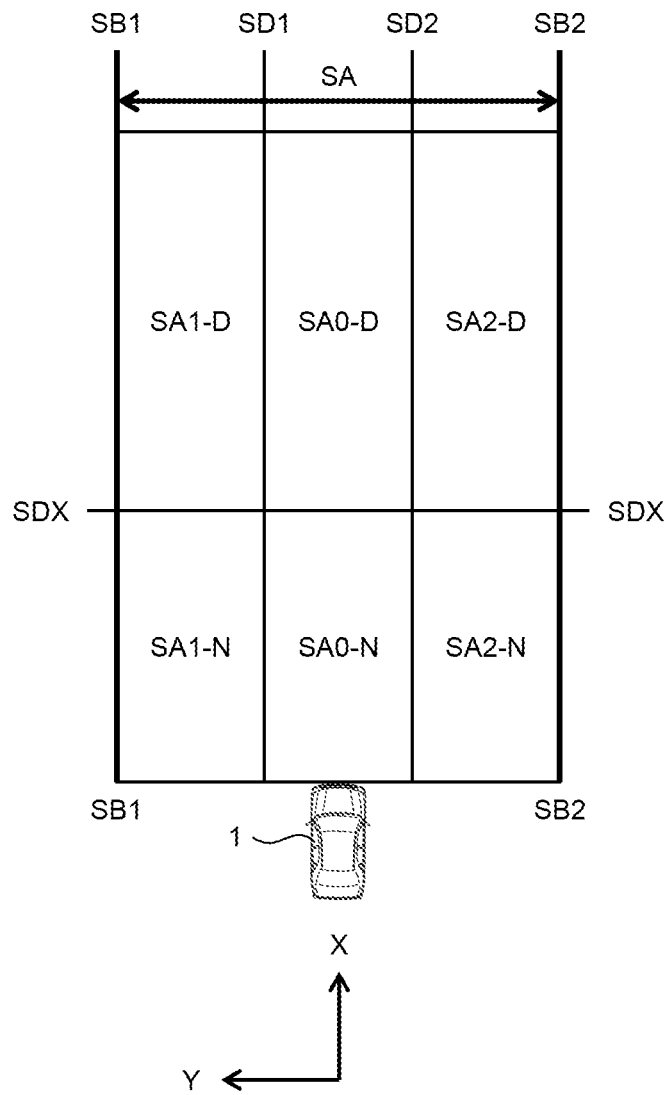
FIG. 17 is a conceptual diagram for explaining another example of the assist area setting process according to an embodiment of the present disclosure.

FIG. 17 is a conceptual diagram for explaining still another example of the assist area setting process (Step S130) according to the present embodiment. Description overlapping with the foregoing description will be appropriately omitted.

In the example shown in FIG. 17, each of the center assist area SA0, the first assist area SA1, and the second assist area SA2 is further divided into two areas by a dividing boundary SDX. More specifically, the center assist area SA0 is divided into a center nearby assist area SA0-N and a center distant assist area SA0-D. The first assist area SA1 is divided into a first nearby assist area SA1-N and a first distant assist area SA1-D. The second assist area SA2 is divided into a second nearby assist area SA2-N and a second distant assist area SA2-D. As viewed from the vehicle 1, each distant assist area SAi-D (i=0, 1, 2) is farther than each nearby assist area SAi-N. In other words, each nearby assist area SAi-N (i=0, 1, 2) is located between the vehicle 1 and each distant assist area SAi-D in a direction of travel of the vehicle 1 (i.e., in the X-direction). A longitudinal distance between the vehicle 1 and the dividing boundary SDX is set to, for example, a distance for which the vehicle 1 travels at a current vehicle speed in a certain period of time.

The processor 110 changes the control strength of the driving assist control between the nearby assist area SAi-N and the distant assist area SAi-D. More specifically, when the crossing target CT exists in the nearby assist area SAi-N, the processor 110 increases the control strength of the driving assist control as compared with a case where the crossing target CT exists in the distant assist area SAi-D. As a result, a sense of uneasiness felt by the occupant of the vehicle 1 is reduced. Conversely, when the crossing target CT exists in the distant assist area SAi-D, the processor 110 reduces the control strength of the driving assist control as compared with a case where the crossing target CT exists in the nearby assist area SAi-N. As a result, excessive driving assist control is suppressed, and thus a sense of strangeness or a sense of annoyance felt by the occupant of the vehicle 1 is reduced.

What is claimed is:

1. A driving assist system that assists driving of a vehicle, the driving assist system comprising:
    a memory configured to store driving environment information indicating a driving environment for the vehicle; and
    a processor configured to execute driving assist control including at least one of deceleration control and steering control for avoiding a collision with a target ahead of the vehicle based on the driving environment information, wherein
    the driving assist control operates when the target exists within an assist area and does not operate when the target exists outside the assist area,
    a roadway area in which the vehicle exists is an area between a first roadway boundary located on a first side as viewed from the vehicle and a second roadway boundary located on a second side opposite to the first side as viewed from the vehicle, a crossing target is the target that crosses the roadway area ahead of the vehicle from the first side toward the second side, the processor is further configured to divide the assist area for the crossing target into a plurality of divided assist areas based on a direction of movement of the crossing target, the plurality of divided assist areas include a first assist area located on the first side as viewed from the vehicle and a second assist area located on the second side as viewed from the vehicle, the processor is further configured to determine in which of the plurality of divided assist areas the crossing target exists, and to execute the driving assist control with a control strength according to a result of the determination, and when the crossing target exists in the second assist area of the roadway area, the processor decreases the control strength of the driving assist control as compared with a case where the crossing target exists in the first assist area based on the direction of movement of the crossing target from the first side towards the second side, wherein the control strength of the driving assist control includes a magnitude of an assist control amount including a deceleration in the deceleration control and a steering angle in the steering control, the assist control amount is expressed as a function of a relative relationship parameter including a relative position and a relative speed between the vehicle and the target, and decreasing the control strength includes reducing the assist control amount corresponding to the same relative relationship parameter.

2. The driving assist system according to claim 1, wherein the processor is further configured to set a risk area around the crossing target and to execute the driving assist control such that the vehicle avoids the risk area, the control strength of the driving assist control includes a size of the risk area, and decreasing the control strength includes narrowing the risk area.

3. The driving assist system according to claim 1, wherein the plurality of divided assist areas further include a center assist area between the first assist area and the second assist area, and when the crossing target exists in the first assist area or the second assist area, the processor decreases the control strength of the driving assist control as compared with a case where the crossing target exists in the center assist area.

4. The driving assist system according to claim 3, wherein the deceleration control when the crossing target exists in the center assist area is set at a default deceleration.

5. The driving assist system according to claim 3, wherein the processor is further configured to set a first dividing boundary of the center assist area at a position apart from a first nearby lane marking toward the first side by a first distance and set a second dividing boundary at a position apart from a second nearby lane marking toward the second side by a second distance.

6. The driving assist system according to claim 1, wherein each of the first assist area and the second assist area is further divided into a nearby assist area and a distant assist area, the nearby assist area is located between the vehicle and the distant assist area in a direction of travel of the vehicle, and when the crossing target exists in the distant assist area, the processor decreases the control strength of the driving assist control as compared with a case where the crossing target exists in the nearby assist area.

* * * * *